US009830899B1

(12) United States Patent
Every et al.

(10) Patent No.: US 9,830,899 B1
(45) Date of Patent: Nov. 28, 2017

(54) ADAPTIVE NOISE CANCELLATION

(71) Applicant: Knowles Electronics, LLC, Itasca, IL (US)

(72) Inventors: Mark Every, Palo Alto, CA (US); Ludger Solbach, Mountain View, CA (US); Carlo Murgia, Sunnyvale, CA (US); Ye Jiang, Sunnyvale, CA (US)

(73) Assignee: Knowles Electronics, LLC, Itasca, IL (US)

( * ) Notice: Subject to any disclaimer, the term of this patent is extended or adjusted under 35 U.S.C. 154(b) by 360 days.

(21) Appl. No.: 14/591,802

(22) Filed: Jan. 7, 2015

Related U.S. Application Data

(63) Continuation of application No. 12/422,917, filed on Apr. 13, 2009, now Pat. No. 8,949,120.

(51) Int. Cl.
*G10L 21/00* (2013.01)
*G10L 15/00* (2013.01)
(Continued)

(52) U.S. Cl.
CPC .............. *G10K 11/16* (2013.01); *G10L 21/02* (2013.01); *G10L 21/0208* (2013.01); *G10L 21/0316* (2013.01)

(58) Field of Classification Search
CPC ..... G10L 15/20; G10L 21/02; G10L 21/0202; G10L 21/0205; G10L 21/0208; G10L 21/02016; G10L 21/0316; G10L 2021/0208; G10L 2021/0216; G10L 2021/0364; G10L 11/178; G10L 11/1783; G10L 11/1782; G10L 11/1786; G10L 11/1788; G10K 2011/00; G10K 2011/10; G10K 2011/30; G10K 2011/3012; G10K 2011/3014; G10K 2011/3016;
(Continued)

(56) References Cited

U.S. PATENT DOCUMENTS 3,976,863 A 8/1976 Engel
3,978,287 A 8/1976 Fletcher et al.
(Continued)

FOREIGN PATENT DOCUMENTS

EP 0756437 A2 1/1997
EP 1232496 A1 8/2002
(Continued)

OTHER PUBLICATIONS

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.
(Continued)

*Primary Examiner* — Paras D Shah
(74) *Attorney, Agent, or Firm* — Foley & Lardner LLP

(57) ABSTRACT

Systems and methods for controlling adaptivity of noise cancellation are presented. One or more audio signals are received by one or more corresponding microphones. The one or more signals may be decomposed into frequency sub-bands. Noise cancellation consistent with identified adaptation constraints is performed on the one or more audio signals. The one or more audio signals may then be reconstructed from the frequency sub-bands and outputted via an output device.

20 Claims, 7 Drawing Sheets

(51) Int. Cl.
*G10K 11/16* (2006.01)
*H04B 15/00* (2006.01)
*G10L 21/0316* (2013.01)
*G10L 21/02* (2013.01)
*G10L 21/0208* (2013.01)

(58) Field of Classification Search
CPC ... G10K 2011/3023; G10K 2011/3026; G10K 2011/3028; G10K 2011/3035; G10K 2011/3041; G10K 2011/3045; G10K 2011/3046; G10K 2011/3055
USPC ........................ 704/226–227, 233, 231, 200; 381/71.1–71.14; 379/387.01–392.01; 455/570
See application file for complete search history.

(56) References Cited

U.S. PATENT DOCUMENTS 4,137,510 A 1/1979 Iwahara
4,433,604 A 2/1984 Ott
4,516,259 A 5/1985 Yato et al.
4,535,473 A 8/1985 Sakata
4,536,844 A 8/1985 Lyon
4,581,758 A 4/1986 Coker et al.
4,628,529 A 12/1986 Borth et al.
4,630,304 A 12/1986 Borth et al.
4,649,505 A 3/1987 Zinser, Jr. et al.
4,658,426 A 4/1987 Chabries et al.
4,674,125 A 6/1987 Carlson et al.
4,718,104 A 1/1988 Anderson
4,811,404 A 3/1989 Vilmur et al.
4,812,996 A 3/1989 Stubbs
4,864,620 A 9/1989 Bialick
4,920,508 A 4/1990 Yassaie et al.
4,991,166 A 2/1991 Julstrom
5,027,306 A 6/1991 Dattorro et al.
5,027,410 A 6/1991 Williamson et al.
5,054,085 A 10/1991 Meisel et al.
5,058,419 A 10/1991 Nordstrom et al.
5,099,738 A 3/1992 Hotz
5,103,229 A 4/1992 Ribner
5,119,711 A 6/1992 Bell et al.
5,142,961 A 9/1992 Paroutaud
5,150,413 A 9/1992 Nakatani et al.
5,175,769 A 12/1992 Hejna, Jr. et al.
5,177,482 A 1/1993 Cideciyan et al.
5,187,776 A 2/1993 Yanker
5,208,864 A 5/1993 Kaneda
5,210,366 A 5/1993 Sykes, Jr.
5,216,423 A 6/1993 Mukherjee
5,222,251 A 6/1993 Roney, IV et al.
5,224,170 A 6/1993 Waite, Jr.
5,230,022 A 7/1993 Sakata
5,319,736 A 6/1994 Hunt
5,323,459 A * 6/1994 Hirano .......................... 379/391
5,341,432 A 8/1994 Suzuki et al.
5,381,473 A 1/1995 Andrea et al.
5,381,512 A 1/1995 Holton et al.
5,400,409 A 3/1995 Linhard
5,402,493 A 3/1995 Goldstein
5,402,496 A 3/1995 Soli et al.
5,406,635 A 4/1995 Jarvinen
5,408,235 A 4/1995 Doyle et al.
5,416,847 A 5/1995 Boze
5,471,195 A 11/1995 Rickman
5,473,759 A 12/1995 Slaney et al.
5,479,564 A 12/1995 Vogten et al.
5,502,663 A 3/1996 Lyon
5,544,250 A * 8/1996 Urbanski ..................... 381/94.3
5,550,924 A 8/1996 Helf et al.
5,574,824 A 11/1996 Slyh et al.
5,590,241 A 12/1996 Park et al.
5,602,962 A 2/1997 Kellermann
5,633,631 A 5/1997 Teckman
5,675,778 A 10/1997 Jones
5,694,474 A 12/1997 Ngo et al.
5,701,350 A 12/1997 Popovich
5,706,395 A 1/1998 Arslan et al.
5,717,829 A 2/1998 Takagi
5,729,612 A 3/1998 Abel et al.
5,732,189 A 3/1998 Johnston et al.
5,749,064 A 5/1998 Pawate et al.
5,757,937 A 5/1998 Itoh et al.
5,777,658 A 7/1998 Kerr et al.
5,792,971 A 8/1998 Timis et al.
5,796,819 A * 8/1998 Romesburg .............. 379/406.09
5,806,025 A 9/1998 Vis et al.
5,809,463 A * 9/1998 Gupta et al. .................. 704/233
5,819,217 A 10/1998 Raman
5,839,101 A 11/1998 Vahatalo et al.
5,845,243 A 12/1998 Smart et al.
5,887,032 A 3/1999 Cioffi
5,920,840 A 7/1999 Satyamurti et al.
5,933,495 A * 8/1999 Oh ........................... 379/406.08
5,937,060 A 8/1999 Oh
5,943,429 A 8/1999 Handel
5,963,651 A 10/1999 Van Veen et al.
5,978,824 A 11/1999 Ikeda
5,983,139 A 11/1999 Zierhofer
5,990,405 A 11/1999 Auten et al.
6,002,776 A 12/1999 Bhadkamkar et al.
6,011,501 A 1/2000 Gong et al.
6,061,456 A 5/2000 Andrea et al.
6,072,881 A 6/2000 Linder
6,092,126 A 7/2000 Rossum
6,097,820 A 8/2000 Turner
6,098,038 A 8/2000 Hermansky et al.
6,108,626 A 8/2000 Cellario et al.
6,122,384 A 9/2000 Mauro
6,122,610 A 9/2000 Isabelle
6,125,175 A 9/2000 Goldberg et al.
6,134,524 A 10/2000 Peters et al.
6,137,349 A 10/2000 Menkhoff et al.
6,140,809 A 10/2000 Doi
6,160,265 A 12/2000 Bacchi et al.
6,160,886 A * 12/2000 Romesburg et al. .... 379/406.05
6,173,255 B1 1/2001 Wilson et al.
6,188,797 B1 2/2001 Moledina et al.
6,205,421 B1 3/2001 Morii
6,205,422 B1 3/2001 Gu et al.
6,208,671 B1 3/2001 Paulos et al.
6,216,103 B1 4/2001 Wu et al.
6,222,927 B1 4/2001 Feng et al.
6,223,090 B1 4/2001 Brungart
6,263,307 B1 7/2001 Arslan et al.
6,266,633 B1 7/2001 Higgins et al.
6,317,501 B1 11/2001 Matsuo
6,321,193 B1 11/2001 Nystrom et al.
6,324,235 B1 11/2001 Savell et al.
6,326,912 B1 12/2001 Fujimori
6,339,706 B1 1/2002 Tillgren et al.
6,339,758 B1 1/2002 Kanazawa et al.
6,355,869 B1 3/2002 Mitton
6,363,345 B1 3/2002 Marash et al.
6,381,570 B2 * 4/2002 Li et al. ........................ 704/233
6,424,938 B1 7/2002 Johansson et al.
6,430,295 B1 8/2002 Handel et al.
6,434,417 B1 8/2002 Lovett
6,449,586 B1 9/2002 Hoshuyama
6,453,289 B1 9/2002 Ertem et al.
6,456,209 B1 9/2002 Savari
6,469,732 B1 10/2002 Chang et al.
6,477,489 B1 11/2002 Lockwood et al.
6,487,257 B1 11/2002 Gustafsson et al.
6,496,795 B1 12/2002 Malvar
6,513,004 B1 1/2003 Rigazio et al.
6,516,066 B2 2/2003 Hayashi
6,516,136 B1 2/2003 Lee
6,526,140 B1 2/2003 Marchok et al.
6,529,606 B1 * 3/2003 Jackson et al. .............. 381/71.4
6,531,970 B2 3/2003 McLaughlin et al.
6,549,630 B1 4/2003 Bobisuthi
6,584,203 B2 6/2003 Elko et al.

(56) References Cited

U.S. PATENT DOCUMENTS 6,647,067 B1 11/2003 Hjelm et al.
6,683,938 B1 1/2004 Henderson
6,717,991 B1 4/2004 Gustafsson et al.
6,718,309 B1 4/2004 Selly
6,735,303 B1 * 5/2004 Okuda .................... 379/406.04
6,738,482 B1 5/2004 Jaber
6,745,155 B1 6/2004 Andringa et al.
6,760,450 B2 7/2004 Matsuo
6,785,381 B2 8/2004 Gartner et al.
6,792,118 B2 9/2004 Watts
6,795,558 B2 9/2004 Matsuo
6,798,886 B1 9/2004 Smith et al.
6,804,203 B1 10/2004 Benyassine et al.
6,804,651 B2 10/2004 Juric et al.
6,810,273 B1 10/2004 Mattila et al.
6,859,508 B1 2/2005 Koyama et al.
6,882,736 B2 4/2005 Dickel et al.
6,915,257 B2 7/2005 Heikkinen et al.
6,915,264 B2 7/2005 Baumgarte
6,917,688 B2 7/2005 Yu et al.
6,934,387 B1 8/2005 Kim
6,978,159 B2 12/2005 Feng et al.
6,982,377 B2 1/2006 Sakurai et al.
6,990,196 B2 1/2006 Zeng et al.
7,003,099 B1 2/2006 Zhang et al.
7,016,507 B1 3/2006 Brennan
7,020,605 B2 3/2006 Gao
7,031,478 B2 4/2006 Belt et al.
7,039,197 B1 * 5/2006 Venkatesh ............. H04R 3/005 381/86
7,042,934 B2 5/2006 Zamir
7,050,388 B2 5/2006 Kim et al.
7,054,452 B2 5/2006 Ukita
7,065,485 B1 6/2006 Chong-White et al.
7,076,315 B1 7/2006 Watts
7,092,529 B2 8/2006 Yu et al.
7,092,882 B2 8/2006 Arrowood et al.
7,099,821 B2 8/2006 Visser et al.
7,127,072 B2 10/2006 Rademacher et al.
7,142,677 B2 11/2006 Gonopolskiy et al.
7,146,013 B1 12/2006 Saito et al.
7,146,316 B2 12/2006 Alves
7,155,019 B2 12/2006 Hou
7,165,026 B2 1/2007 Acero et al.
7,171,008 B2 1/2007 Elko
7,171,246 B2 1/2007 Mattila et al.
7,174,022 B1 2/2007 Zhang et al.
7,190,665 B2 3/2007 Warke et al.
7,206,418 B2 4/2007 Yang et al.
7,209,567 B1 4/2007 Kozel et al.
7,225,001 B1 5/2007 Eriksson et al.
7,242,762 B2 * 7/2007 He et al. .................. 379/406.08
7,246,058 B2 7/2007 Burnett
7,254,242 B2 8/2007 Ise et al.
7,289,554 B2 10/2007 Alloin
7,289,955 B2 10/2007 Deng et al.
7,327,985 B2 2/2008 Morfitt, III et al.
7,330,138 B2 2/2008 Mallinson et al.
7,339,503 B1 3/2008 Elenes
7,359,504 B1 4/2008 Reuss et al.
7,359,520 B2 4/2008 Brennan et al.
7,376,558 B2 5/2008 Gemello et al.
7,383,179 B2 6/2008 Alves et al.
7,395,298 B2 7/2008 Debes et al.
7,412,379 B2 8/2008 Taori et al.
7,433,907 B2 10/2008 Nagai et al.
7,436,333 B2 10/2008 Forman et al.
7,555,075 B2 6/2009 Pessoa et al.
7,555,434 B2 6/2009 Nomura et al.
7,561,627 B2 7/2009 Chow et al.
7,577,084 B2 8/2009 Tang et al.
7,617,099 B2 11/2009 Yang et al.
7,657,038 B2 2/2010 Doclo et al.
7,725,314 B2 5/2010 Wu et al.
7,764,752 B2 7/2010 Langberg et al.
7,777,658 B2 8/2010 Nguyen et al.
7,783,032 B2 8/2010 Abutalebi et al.
7,783,481 B2 8/2010 Endo et al.
7,895,036 B2 2/2011 Hetherington et al.
7,912,567 B2 3/2011 Chhatwal et al.
7,949,522 B2 * 5/2011 Hetherington et al. ...... 704/226
7,953,596 B2 5/2011 Pinto
8,010,355 B2 8/2011 Rahbar
8,032,364 B1 10/2011 Watts
8,046,219 B2 10/2011 Zurek et al.
8,081,878 B1 12/2011 Zhang et al.
8,098,812 B2 1/2012 Fadili et al.
8,103,011 B2 1/2012 Mohammad et al.
8,107,656 B2 1/2012 Dreßler et al.
8,126,159 B2 2/2012 Goose et al.
8,143,620 B1 3/2012 Malinowski et al.
8,150,065 B2 4/2012 Solbach et al.
8,160,265 B2 4/2012 Mao et al.
8,180,062 B2 5/2012 Turku et al.
8,180,064 B1 5/2012 Avendano et al.
8,184,818 B2 5/2012 Ishiguro
8,189,766 B1 5/2012 Klein
8,194,880 B2 6/2012 Avendano
8,194,882 B2 6/2012 Every et al.
8,204,252 B1 6/2012 Avendano
8,204,253 B1 6/2012 Solbach
8,280,731 B2 10/2012 Yu
8,345,890 B2 1/2013 Avendano et al.
8,355,511 B2 1/2013 Klein
8,359,195 B2 1/2013 Li
8,378,871 B1 2/2013 Bapat
8,411,872 B2 4/2013 Stothers et al.
8,447,045 B1 5/2013 Laroche
8,473,287 B2 6/2013 Every et al.
8,488,805 B1 7/2013 Santos et al.
8,494,193 B2 7/2013 Zhang et al.
8,521,530 B1 8/2013 Every et al.
8,526,628 B1 9/2013 Massie et al.
8,538,035 B2 9/2013 Every et al.
8,611,551 B1 12/2013 Massie et al.
8,611,552 B1 12/2013 Murgia et al.
8,718,290 B2 5/2014 Murgia et al.
8,737,188 B1 5/2014 Murgia et al.
8,737,532 B2 5/2014 Green et al.
8,744,844 B2 6/2014 Klein
8,761,385 B2 * 6/2014 Sugiyama ................ 379/406.04
8,774,423 B1 7/2014 Solbach
8,804,865 B2 8/2014 Elenes et al.
8,848,935 B1 9/2014 Massie et al.
8,867,759 B2 10/2014 Avendano et al.
8,886,525 B2 11/2014 Klein
8,934,641 B2 1/2015 Avendano et al.
8,949,120 B1 2/2015 Every et al.
8,965,942 B1 2/2015 Rossum et al.
9,049,282 B1 6/2015 Murgia et al.
9,076,456 B1 7/2015 Avendano et al.
9,185,487 B2 11/2015 Solbach et al.
9,236,874 B1 1/2016 Rossum
2001/0016020 A1 8/2001 Gustafsson et al.
2001/0031053 A1 10/2001 Feng et al.
2001/0046304 A1 11/2001 Rast
2001/0053228 A1 12/2001 Jones
2002/0002455 A1 1/2002 Accardi et al.
2002/0009203 A1 1/2002 Erten
2002/0036578 A1 3/2002 Reefman
2002/0041693 A1 4/2002 Matsuo
2002/0080980 A1 6/2002 Matsuo
2002/0106092 A1 8/2002 Matsuo
2002/0116187 A1 8/2002 Erten
2002/0133334 A1 9/2002 Coorman et al.
2002/0147595 A1 10/2002 Baumgarte
2002/0156624 A1 10/2002 Gigi
2002/0176589 A1 11/2002 Buck et al.
2003/0014248 A1 1/2003 Vetter
2003/0026437 A1 2/2003 Janse et al.
2003/0033140 A1 2/2003 Taori et al.
2003/0038736 A1 2/2003 Becker et al.
2003/0039369 A1 2/2003 Bullen
2003/0040908 A1 2/2003 Yang et al.

(56) References Cited

U.S. PATENT DOCUMENTS

2003/0061032 A1* 3/2003 Gonopolskiy .......... G10L 21/02 704/200.1
2003/0063759 A1 4/2003 Brennan et al.
2003/0072382 A1 4/2003 Raleigh et al.
2003/0072460 A1 4/2003 Gonopolskiy et al.
2003/0095667 A1 5/2003 Watts
2003/0099345 A1 5/2003 Gartner et al.
2003/0101048 A1 5/2003 Liu
2003/0103632 A1 6/2003 Goubran et al.
2003/0128851 A1 7/2003 Furuta
2003/0138116 A1 7/2003 Jones et al.
2003/0147538 A1 8/2003 Elko
2003/0169891 A1 9/2003 Ryan et al.
2003/0191641 A1 10/2003 Acero et al.
2003/0219130 A1 11/2003 Baumgarte et al.
2003/0228023 A1* 12/2003 Burnett et al. .................. 381/92
2004/0001450 A1 1/2004 He et al.
2004/0013276 A1 1/2004 Ellis et al.
2004/0015348 A1 1/2004 McArthur et al.
2004/0042616 A1 3/2004 Matsuo
2004/0047464 A1* 3/2004 Yu et al. .................. 379/392.01
2004/0047474 A1 3/2004 Vries et al.
2004/0078199 A1 4/2004 Kremer et al.
2004/0105550 A1 6/2004 Aylward et al.
2004/0111258 A1 6/2004 Zangi et al.
2004/0125965 A1 7/2004 Alberth, Jr. et al.
2004/0131178 A1 7/2004 Shahaf et al.
2004/0133421 A1 7/2004 Burnett et al.
2004/0165736 A1 8/2004 Hetherington et al.
2004/0185804 A1 9/2004 Kanamori et al.
2004/0196989 A1 10/2004 Friedman et al.
2004/0220800 A1 11/2004 Kong et al.
2004/0247111 A1 12/2004 Popovic et al.
2004/0263636 A1 12/2004 Cutler et al.
2005/0008179 A1 1/2005 Quinn
2005/0025263 A1 2/2005 Wu
2005/0027520 A1 2/2005 Mattila et al.
2005/0049864 A1 3/2005 Kaltenmeier et al.
2005/0060142 A1 3/2005 Visser et al.
2005/0066279 A1 3/2005 LeBarton et al.
2005/0114128 A1 5/2005 Hetherington et al.
2005/0152559 A1 7/2005 Gierl et al.
2005/0152563 A1 7/2005 Amada et al.
2005/0185813 A1 8/2005 Sinclair et al.
2005/0203735 A1 9/2005 Ichikawa
2005/0213778 A1 9/2005 Buck et al.
2005/0216259 A1 9/2005 Watts
2005/0226426 A1 10/2005 Oomen et al.
2005/0228518 A1 10/2005 Watts
2005/0261894 A1 11/2005 Balan et al.
2005/0276423 A1 12/2005 Aubauer et al.
2005/0288923 A1 12/2005 Kok
2006/0072768 A1 4/2006 Schwartz et al.
2006/0074646 A1 4/2006 Alves et al.
2006/0098809 A1 5/2006 Nongpiur et al.
2006/0120537 A1* 6/2006 Burnett et al. ............... 381/71.6
2006/0133621 A1 6/2006 Chen et al.
2006/0149535 A1 7/2006 Choi et al.
2006/0153391 A1 7/2006 Hooley et al.
2006/0160581 A1 7/2006 Beaugeant et al.
2006/0184363 A1 8/2006 McCree et al.
2006/0222184 A1* 10/2006 Buck et al. .................. 381/71.1
2007/0021958 A1 1/2007 Visser et al.
2007/0027685 A1 2/2007 Arakawa et al.
2007/0033020 A1 2/2007 (Kelleher) Francois et al.
2007/0041589 A1 2/2007 Patel et al.
2007/0055505 A1 3/2007 Doclo et al.
2007/0071206 A1 3/2007 Gainsboro et al.
2007/0078649 A1 4/2007 Hetherington et al.
2007/0094031 A1 4/2007 Chen
2007/0110263 A1 5/2007 Brox
2007/0116300 A1 5/2007 Chen
2007/0136059 A1 6/2007 Gadbois
2007/0150268 A1 6/2007 Acero et al.
2007/0154031 A1 7/2007 Avendano et al.
2007/0165879 A1 7/2007 Deng et al.
2007/0195968 A1 8/2007 Jaber
2007/0230712 A1 10/2007 Belt et al.
2007/0230913 A1 10/2007 Ichimura
2007/0233479 A1 10/2007 Burnett
2007/0276656 A1 11/2007 Solbach et al.
2007/0294263 A1 12/2007 Punj et al.
2008/0019548 A1 1/2008 Avendano
2008/0031466 A1* 2/2008 Buck ..................... H04M 9/082 381/66
2008/0033723 A1 2/2008 Jang et al.
2008/0037801 A1* 2/2008 Alves et al. ................. 381/71.6
2008/0059163 A1 3/2008 Ding et al.
2008/0069374 A1 3/2008 Zhang
2008/0071540 A1 3/2008 Nakano et al.
2008/0140391 A1 6/2008 Yen et al.
2008/0152157 A1* 6/2008 Lin et al. ..................... 381/71.1
2008/0159573 A1 7/2008 Dressler et al.
2008/0162123 A1 7/2008 Goldin
2008/0170703 A1 7/2008 Zivney
2008/0186218 A1 8/2008 Ohkuri et al.
2008/0187148 A1 8/2008 Itabashi et al.
2008/0201138 A1* 8/2008 Visser et al. .................. 704/227
2008/0228478 A1* 9/2008 Hetherington et al. ...... 704/233
2008/0247556 A1 10/2008 Hess
2008/0260175 A1 10/2008 Elko
2008/0273476 A1 11/2008 Cohen et al.
2008/0306736 A1 12/2008 Sanyal et al.
2008/0317257 A1* 12/2008 Furge et al. .................... 381/86
2009/0003640 A1 1/2009 Burnett
2009/0012783 A1* 1/2009 Klein ............................ 704/226
2009/0012786 A1* 1/2009 Zhang et al. ................. 704/233
2009/0022335 A1* 1/2009 Konchitsky ............ H04R 1/406 381/92
2009/0048824 A1* 2/2009 Amada ............... G10L 21/0208 704/10
2009/0063142 A1 3/2009 Sukkar
2009/0080632 A1 3/2009 Zhang et al.
2009/0089053 A1 4/2009 Wang et al.
2009/0089054 A1* 4/2009 Wang et al. .................. 704/233
2009/0116652 A1 5/2009 Kirkeby et al.
2009/0129610 A1* 5/2009 Kim et al. ................... 381/94.7
2009/0144053 A1 6/2009 Tamura et al.
2009/0154717 A1 6/2009 Hoshuyama
2009/0164212 A1 6/2009 Chan et al.
2009/0177464 A1 7/2009 Gao et al.
2009/0220107 A1 9/2009 Every et al.
2009/0220197 A1 9/2009 Gniadek et al.
2009/0228272 A1 9/2009 Herbig et al.
2009/0238373 A1 9/2009 Klein
2009/0238377 A1* 9/2009 Ramakrishnan et al. ...... 381/92
2009/0240495 A1* 9/2009 Ramakrishnan .... G10L 21/0272 704/226
2009/0245335 A1 10/2009 Fang
2009/0245444 A1 10/2009 Fang
2009/0248411 A1 10/2009 Konchitsky et al.
2009/0253418 A1 10/2009 Makinen
2009/0271187 A1 10/2009 Yen et al.
2009/0296958 A1 12/2009 Sugiyama
2009/0316918 A1 12/2009 Niemisto et al.
2009/0323982 A1 12/2009 Solbach et al.
2010/0017205 A1* 1/2010 Visser et al. .................. 704/225
2010/0027799 A1 2/2010 Romesburg et al.
2010/0067710 A1 3/2010 Hendriks et al.
2010/0076769 A1 3/2010 Yu
2010/0094643 A1 4/2010 Avendano et al.
2010/0138220 A1 6/2010 Matsumoto et al.
2010/0158267 A1 6/2010 Thormundsson et al.
2010/0166199 A1 7/2010 Seydoux
2010/0177916 A1 7/2010 Gerkmann et al.
2010/0239105 A1* 9/2010 Pan ............................. 381/94.9
2010/0246849 A1 9/2010 Sudo et al.
2010/0267340 A1 10/2010 Lee
2010/0272275 A1 10/2010 Carreras et al.
2010/0272276 A1 10/2010 Carreras et al.
2010/0278352 A1 11/2010 Petit et al.
2010/0290615 A1 11/2010 Takahashi
2010/0290636 A1 11/2010 Mao et al.
2010/0309774 A1 12/2010 Astrom

(56) References Cited

U.S. PATENT DOCUMENTS

| | | | |
|---|---|---|---|
| 2011/0007907 | A1 | 1/2011 | Park et al. |
| 2011/0019833 | A1 | 1/2011 | Kuech et al. |
| 2011/0035213 | A1 | 2/2011 | Malenovsky et al. |
| 2011/0123019 | A1 | 5/2011 | Gowreesunker et al. |
| 2011/0158419 | A1 | 6/2011 | Theverapperuma et al. |
| 2011/0178800 | A1 | 7/2011 | Watts |
| 2011/0182436 | A1 | 7/2011 | Murgia et al. |
| 2011/0243344 | A1 | 10/2011 | Bakalos et al. |
| 2011/0257967 | A1 | 10/2011 | Every et al. |
| 2011/0261150 | A1 | 10/2011 | Goyal et al. |
| 2011/0299695 | A1 | 12/2011 | Nicholson |
| 2012/0027218 | A1 | 2/2012 | Every et al. |
| 2012/0063609 | A1 | 3/2012 | Triki et al. |
| 2012/0087514 | A1 | 4/2012 | Williams et al. |
| 2012/0116758 | A1 | 5/2012 | Murgia et al. |
| 2012/0121096 | A1 | 5/2012 | Chen et al. |
| 2012/0140917 | A1 | 6/2012 | Nicholson et al. |
| 2012/0179462 | A1 | 7/2012 | Klein |
| 2012/0197898 | A1 | 8/2012 | Pandey et al. |
| 2012/0220347 | A1 | 8/2012 | Davidson |
| 2012/0237037 | A1 | 9/2012 | Ninan et al. |
| 2012/0250871 | A1 | 10/2012 | Lu et al. |
| 2013/0011111 | A1 | 1/2013 | Abraham et al. |
| 2013/0024190 | A1 | 1/2013 | Fairey |
| 2013/0096914 | A1 | 4/2013 | Avendano et al. |
| 2014/0098964 | A1 | 4/2014 | Rosca et al. |
| 2014/0205107 | A1 | 7/2014 | Murgia et al. |
| 2014/0241702 | A1 | 8/2014 | Solbach et al. |
| 2015/0025881 | A1 | 1/2015 | Carlos et al. |
| 2016/0027451 | A1 | 1/2016 | Solbach et al. |
| 2016/0064009 | A1 | 3/2016 | Every et al. |

FOREIGN PATENT DOCUMENTS

| | | | |
|---|---|---|---|
| EP | 1474755 | A1 | 11/2004 |
| FI | 20080428 | A | 7/2008 |
| FI | 20100431 | A | 12/2010 |
| FI | 20125814 | | 10/2012 |
| FI | 20126083 | A | 10/2012 |
| FI | 124716 | B | 12/2014 |
| JP | 62110349 | | 5/1987 |
| JP | 4184400 | B2 | 7/1992 |
| JP | 5053587 | B2 | 3/1993 |
| JP | 6269083 | | 9/1994 |
| JP | H07248793 | | 9/1995 |
| JP | H10313497 | | 11/1998 |
| JP | H11249693 | | 9/1999 |
| JP | 2001159899 | A | 6/2001 |
| JP | 2002366200 | A | 12/2002 |
| JP | 2002542689 | A | 12/2002 |
| JP | 2003514473 | A | 4/2003 |
| JP | 2003271191 | A | 9/2003 |
| JP | 2004187283 | A | 7/2004 |
| JP | 2005110127 | A | 4/2005 |
| JP | 2005518118 | A | 6/2005 |
| JP | 2005195955 | A | 7/2005 |
| JP | 2006094522 | A | 4/2006 |
| JP | 2006337415 | A | 12/2006 |
| JP | 2007006525 | A | 1/2007 |
| JP | 2008015443 | A | 1/2008 |
| JP | 2008065090 | A | 3/2008 |
| JP | 2008135933 | A | 6/2008 |
| JP | 2009522942 | A | 6/2009 |
| JP | 2010532879 | A | 10/2010 |
| JP | 2011527025 | A | 10/2011 |
| JP | 5007442 | B2 | 6/2012 |
| JP | 2013518477 | A | 5/2013 |
| JP | 2013525843 | A | 6/2013 |
| JP | 5675848 | B2 | 1/2015 |
| JP | 5762956 | B2 | 6/2015 |
| KR | 1020080092404 | | 10/2008 |
| KR | 1020100041741 | | 4/2010 |
| KR | 1020110038024 | | 4/2011 |
| KR | 101210313 | B1 | 12/2012 |
| KR | 1020120114327 | | 6/2013 |
| KR | 1020130061673 | | 6/2013 |
| KR | 101461141 | B1 | 11/2014 |
| TW | 526468 | B | 4/2003 |
| TW | 200305854 | A | 11/2003 |
| TW | 200629240 | | 8/2006 |
| TW | 200705389 | | 2/2007 |
| TW | I279776 | | 4/2007 |
| TW | 200910793 | A | 3/2009 |
| TW | 201009817 | A | 3/2010 |
| TW | 201142829 | A | 12/2011 |
| TW | 201207845 | A | 2/2012 |
| TW | I463817 | | 12/2014 |
| TW | I465121 | | 12/2014 |
| TW | 201513099 | A | 4/2015 |
| TW | I488179 | | 6/2015 |
| WO | WO0137265 | | 5/2001 |
| WO | WO0141504 | A1 | 6/2001 |
| WO | WO0156328 | | 8/2001 |
| WO | WO0174118 | | 10/2001 |
| WO | WO03043374 | | 5/2003 |
| WO | WO03069499 | | 8/2003 |
| WO | WO2008045476 | A2 | 10/2004 |
| WO | WO2006027707 | A1 | 3/2006 |
| WO | WO2007001068 | A1 | 1/2007 |
| WO | WO2007049644 | A1 | 5/2007 |
| WO | WO2007081916 | A2 | 7/2007 |
| WO | WO2009008998 | A1 | 1/2009 |
| WO | WO2009035614 | A1 | 3/2009 |
| WO | WO2010005493 | A1 | 1/2010 |
| WO | WO2011091068 | A1 | 7/2011 |
| WO | WO2011094232 | A1 | 8/2011 |
| WO | WO2011133405 | A1 | 10/2011 |
| WO | WO2012097016 | A1 | 7/2012 |
| WO | WO2014131054 | A2 | 8/2014 |
| WO | WO2015010129 | A1 | 1/2015 |

OTHER PUBLICATIONS

Allen, Jont B. et al., "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

Boll, Steven F. et al., "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al., "New Insights into the Noise Reduction Wiener Filter", IEEE Transactions on Audio, Speech, and Language Processing. vol. 14, No. 4, Jul. 2006, pp. 1218-1234.

Cohen, Israel et al., "Microphone Array Post-Filtering for Non-Stationary Noise Suppression", IEEE International Conference on Acoustics, Speech, and Signal Processing, May 2002, pp. 1-4.

Cohen, Israel, "Multichannel Post-Filtering in Nonstationary Noise Environments", IEEE Transactions on Signal Processing, vol. 52, No. 5, May 2004, pp. 1149-1160.

Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.

Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.

"ENT 172." Instructional Module. Prince George's Community College Department of Engineering Technology. Accessed: Oct. 15,

(56) References Cited

OTHER PUBLICATIONS

2011. Subsection: "Polar and Rectangular Notation". <http://academic.ppgcc.edu/ent/ent172_instr_mod.html>.
Fuchs, Martin et al., "Noise Suppression for Automotive Applications Based on Directional Information", 2004 IEEE International Conference on Acoustics, Speech, and Signal Processing, May 17-21, pp. 237-240.
Fulghum, D. P. et al., "LPC Voice Digitizer with Background Noise Suppression", 1979 IEEE International Conference on Acoustics, Speech, and Signal Processing, pp. 220-223.
Goubran, R.A. et al., "Acoustic Noise Suppression Using Regressive Adaptive Filtering", 1990 IEEE 40th Vehicular Technology Conference, May 6-9, pp. 48-53.
Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.
Haykin, Simon et al., "Appendix A.2 Complex Numbers." Signals and Systems. 2nd Ed. 2003. p. 764.
Hermansky, Hynek "Should Recognizers Have Ears?", In Proc. ESCA Tutorial and Research Workshop on Robust Speech Recognition for Unknown Communication Channels, pp. 1-10, France 1997.
Hohmann, V. "Frequency Analysis and Synthesis Using a Gammatone Filterbank", ACTA Acustica United with Acustica, 2002, vol. 88, pp. 433-442.
Jeffress, Lloyd A. et al., "A Place Theory of Sound Localization," Journal of Comparative and Physiological Psychology, 1948, vol. 41, p. 35-39.
Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.
Kates, James M. "A Time-Domain Digital Cochlear Model", IEEE Transactions on Signal Processing, Dec. 1991, vol. 39, No. 12, pp. 2573-2592.
Kato et al., "Noise Suppression with High Speech Quality Based on Weighted Noise Estimation and MMSE STSA" Proc. IWAENC [Online] 2001, pp. 183-186.
Lazzaro, John et al., "A Silicon Model of Auditory Localization," Neural Computation Spring 1989, vol. 1, pp. 17-57, Massachusetts Institute of Technology.
Lippmann, Richard P. "Speech Recognition by Machines and Humans", Speech Communication, Jul. 1997, vol. 22, No. 1, pp. 1-15.
Liu, Chen et al., "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.
Martin, Rainer et aL, "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.
Martin, Rainer "Spectral Subtraction Based on Minimum Statistics", in Proceedings Europe. Signal Processing Conf., 1994, pp. 1182-1185.
Mitra, Sanjit K. Digital Signal Processing: a Computer-based Approach. 2nd Ed. 2001. pp. 131-133.
Mizumachi, Mitsunori et al., "Noise Reduction by Paired-Microphones Using Spectral Subtraction", 1998 IEEE International Conference on Acoustics, Speech and Signal Processing, May 12-15, pp. 1001-1004.
Moonen, Marc et al., "Multi-Microphone Signal Enhancement Techniques for Noise Suppression and Dereverbration," http://www.esat.kuleuven.ac.be/sista/yearreport97//node37.html, accessed on Apr. 21, 1998.
Watts, Lloyd Narrative of Prior Disclosure of Audio Display on Feb. 15, 2000 and May 31, 2000.
Cosi, Piero et al., (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.
Parra, Lucas et al., "Convolutive Blind Separation of Non-Stationary Sources", IEEE Transactions on Speech and Audio Processing. vol. 8, No. 3, May 2008, pp. 320-327.
Rabiner, Lawrence R. et al., "Digital Processing of Speech Signals", (Prentice-Hall Series in Signal Processing). Upper Saddle River, NJ: Prentice Hall, 1978.
Weiss Ron et al., "Estimating Single-Channel Source Separation Masks: *Revelance Vector Machine Classifiers* vs. *Pitch-Based Masking*", Workshop on Statistical and Perceptual Audio Processing, 2006.
Schimmel, Steven et al., "Coherent Envelope Detection for Modulation Filtering of Speech," 2005 IEEE International Conference on Acoustics, Speech, and Signal Processing, vol. 1, No. 7, pp. 221-224.
Slaney, Malcom, "Lyon's Cochlear Model", Advanced Technology Group, Apple Technical Report #13, Apple Computer, Inc., 1988, pp. 1-79.
Slaney, Malcom, et al., "Auditory Model Inversion for Sound Separation," 1994 IEEE International Conference on Acoustics, Speech and Signal Processing, Apr. 19-22, vol. 2, pp. 77-80.
Slaney, Malcom. "An Introduction to Auditory Model Inversion", Interval Technical Report IRC 1994-014, http://coweb.ecn.purdue.edu/-maclom/interval/1994-014/, Sep. 1994, accessed on Jul. 6, 2010.
Solbach, Ludger "An Architecture for Robust Partial Tracking and Onset Localization in Single Channel Audio Signal Mixes", Technical University Hamburg-Harburg, 1998.
Soon et al., "Low Distortion Speech Enhancement" Proc. Inst. Elect. Eng. [Online] 2000, vol. 147, pp. 247-253.
Stahl, V. et al., "Quantile Based Noise Estimation for Spectral Subtraction and Wiener Filtering," 2000 IEEE International Conference on Acoustics, Speech, and Signal Processing, Jun. 5-9, vo1.3, pp. 1875-1878.
Syntrillium Software Corporation, "Cool Edit User's Manual", 1996, pp. 1-74.
Tashev, Ivan et al., "Microphone Array for Headset with Spatial Noise Suppressor", http://research.microsoft.com/users/ivantash/Documents/Tashev_MAforHeadset_HSCMA_05.pdf. (4 pages).
Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.
Valin, Jean-Marc et al., "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.
Watts, Lloyd, "Robust Hearing Systems for Intelligent Machines," Applied Neurosystems Corporation, 2001, pp. 1-5.
Widrow, B. et al., "Adaptive Antenna Systems," Proceedings of the IEEE, vol. 55, No. 12, pp. 2143-2159, Dec. 1967.
Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.
International Search Report & Written Opinion dated Nov. 27, 2015 in Patent Cooperation Treaty Application No. PCT/US2015/047263, filed Aug. 27, 2015.
International Search Report dated Jun. 8, 2001 in Patent Cooperation Treaty Application No. PCT/US2001/008372.
International Search Report dated Apr. 3, 2003 in Patent Cooperation Treaty Application No. PCT/US2002/036946.
International Search Report dated May 29, 2003 in Patent Cooperation Treaty Application No. PCT/US2003/004124.
International Search Report and Written Opinion dated Oct. 19, 2007 in Patent Cooperation Treaty Application No. PCT/US2007/000463.
International Search Report and Written Opinion dated Apr. 9, 2008 in Patent Cooperation Treaty Application No. PCT/US2007/021654.

(56) References Cited

OTHER PUBLICATIONS

International Search Report and Written Opinion dated Sep. 16, 2008 in Patent Cooperation Treaty Application No. PCT/US2007/012628.

International Search Report and Written Opinion dated Oct. 1, 2008 in Patent Cooperation Treaty Application No. PCT/US2008/008249.

International Search Report and Written Opinion dated Aug. 27, 2009 in Patent Cooperation Treaty Application No. PCT/US2009/003813.

Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.

Demol, M. et al., "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.

Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.

Moulines, Eric et al., "Non-Parametric Techniques for Pitch-Scale and Time-Scale Modification of Speech", Speech Communication, vol. 16, pp. 175-205, 1995.

Verhelst, Werner, "Overlap-Add Methods for Time-Scaling of Speech", Speech Communication vol. 30, pp. 207-221, 2000.

Bach et al., Learning Spectral Clustering with application to spech separation, Journal of machine learning research, 2006.

Mokbel et al., 1995, IEEE Transactions of Speech and Audio Processing, vol. 3, No. 5, Sep. 1995, pp. 346-356.

Office Action dated Oct. 14, 2013 in Taiwanese Patent Application 097125481, filed Jul. 4, 2008.

Office Action dated Oct. 29, 2013 in Japanese Patent Application 2011-516313, filed Jun. 26, 2009.

Office Action dated Dec. 20, 2013 in Taiwanese Patent Application 096146144, filed Dec. 4, 2007.

Office Action dated Dec. 9, 2013 in Finnish Patent Application 20100431, filed Jun. 26, 2009.

Office Action dated Jan. 20, 2014 in Finnish Patent Application 20100001, filed Jul. 3, 2008.

Office Action dated Mar. 10, 2014 in Taiwanese Patent Application 097125481, filed Jul. 4, 2008.

Bai et al., "Upmixing and Downmixing Two-channel Stereo Audio for Consumer Electronics". IEEE Transactions on Consumer Electronics [Online] 2007, vol. 53, Issue 3, pp. 1011-1019.

Jo et al., "Crosstalk cancellation for spatial sound reproduction in portable devices with stereo loudspeakers". Communications in Computer and Information Science [Online] 2011, vol. 266, pp. 114-123.

Nongpuir et al., "NEXT cancellation system with improved convergence rate and tracking performance". IEEE Proceedings—Communications [Online] 2005, vol. 152, Issue 3, pp. 378-384.

Ahmed et al., "Blind Crosstalk Cancellation for DMT Systems" IEEE—Emergent Technologies Technical Committee. Sep. 2002. pp. 1-5.

Allowance dated May 21, 2014 in Finnish Patent Application 20100001, filed Jan. 4, 2010.

Office Action dated May 2, 2014 in Taiwanese Patent Application 098121933, filed Jun. 29, 2009.

Office Action dated Apr. 15, 2014 in Japanese Patent Application 2010-514871, filed Jul. 3, 2008.

Elhilali et al.,"A cocktail party with a cortical twist: How cortical mechanisms contribute to sound segregation." J Acoust Soc Am. Dec. 2008 124(6): 3751-3771).

Jin et al., "HMM-Based Multipitch Tracking for Noisy and Reverberant Speech." Jul. 2011.

Kawahara, W., et al., "TANDEM-STRAIGHT: A temporally stable power spectral representation for periodic signals and applications to interference-free spectrum, F0, and aperiodicity estimation." IEEE ICASSP 2008.

Office Action dated Jun. 27, 2014 in Korean Patent Application No. 10-2010-7000194, filed Jan. 6, 2010.

Office Action dated Jun. 18, 2014 in Finnish Patent Application No. 20080428, filed Jul. 4, 2008.

International Search Report & Written Opinion dated Jul. 15, 2014 in Patent Cooperation Treaty Application No. PCT/US2014/018443, filed Feb. 25, 2014.

Notice of Allowance dated Aug. 26, 2014 in Taiwanese Application No. 096146144, filed Dec. 4, 2007.

Notice of Allowance dated Sep. 16, 2014 in Korean Application No. 10-2010-7000194, filed Jul. 3, 2008.

Notice of Allowance dated Sep. 29, 2014 in Taiwanese Application No. 097125481, filed Jul. 4, 2008.

Notice of Allowance dated Oct. 10, 2014 in Finnish Application No. 20100001, filed Jul. 3, 2008.

International Search Report & Written Opinion dated Nov. 12, 2014 in Patent Cooperation Treaty Application No. PCT/US2014/047458, filed Jul. 21, 2014.

Office Action dated Oct. 28, 2014 in Japanese Patent Application No. 2011-516313, filed Dec. 27, 2012.

Heiko Purnhagen, "Low Complexity Parametric Stereo Coding in MPEG-4," Proc. of the 7th Int. Conference on Digital Audio Effects (DAFx'04), Naples, Italy, Oct. 5-8, 2004.

Dhun-Ming Chang et al., "Voltage-Mode Multifunction Filter with Single Input and Three Outputs Using Two Compound Current Conveyors" IEEE Transactions on Circuits and Systems-I: Fundamental Theory and Applications, vol. 46, No. 11, Nov. 1999.

Notice of Allowance dated Feb. 10, 2015 in Taiwanese Patent Application No. 098121933, filed Jun. 29, 2009.

Office Action dated Jan. 30, 2015 in Finnish Patent Application No. 20080623, filed May 24, 2007.

Office Action dated Mar. 24, 2015 in Japanese Patent Application No. 2011-516313, filed Jun. 26, 2009.

Office Action dated Apr. 16, 2015 in Korean Patent Application No. 10-2011-7000440, filed Jun. 26, 2009.

Notice of Allowance dated Jun. 2, 2015 in Japanese Patent Application 2011-516313, filed Jun. 26, 2009.

Office Action dated Jun. 4, 2015 in Finnish Patent Application 20080428, filed Jan. 5, 2007.

Office Action dated Jun. 9, 2015 in Japanese Patent Application 2014-165477 filed Jul. 3, 2008.

Notice of Allowance dated Aug. 13, 2015 in Finnish Patent Application 20080623, filed May 24, 2007.

International Search Report and Written Opinion dated Mar. 31, 2011 in Patent Cooperation Treaty Application No. PCT/US2011/022462, filed Jan. 25, 2011.

International Search Report and Written Opinion dated Jul. 5, 2011 in Patent Cooperation Treaty Application No. PCT/US11/32578.

Office Action dated Oct. 30, 2014 in Korean Patent Application No. 10-2012-7027238, filed Apr. 14, 2011.

Jung et al., "Feature Extraction through the Post Processing of WFBA Based on MMSE-STSA for Robust Speech Recognition," Proceedings of the Acoustical Society of Korea Fall Conference, vol. 23, No. 2(s), pp. 39-42, Nov. 2004.

Notice of Allowance dated Nov. 25, 2014 in Japan Application No. 2012-550214, filed Jul. 24, 2012.

Office Action dated Dec. 10, 2014 in Finland Patent Application No. 20126083, filed Apr. 14, 2011.

Lu et al., "Speech Enhancement Using Hybrid Gain Factor in Critical-Band-Wavelet-Packet Transform", Digital Signal Processing, vol. 17, Jan. 2007, pp. 172-188.

Office Action dated Apr. 17, 2015 in Taiwan Patent Application No. 100102945, filed Jan. 26, 2011.

Office Action dated May 11, 2015 in Finland Patent Application 20125814, filed Jan. 25, 2011.

Office Action dated Jun. 26, 2015 in South Korean Patent Application 1020127027238 filed Apr. 14, 2011.

Office Action dated Jul. 2, 2015 in Finland Patent Application 20126083 filed Apr. 14, 2011.

(56) References Cited

OTHER PUBLICATIONS

Office Action dated Jun. 23, 2015 in Japan Patent Application 2013-506188 filed Apr. 14, 2011.
Office Action dated Oct. 29, 2015 in Korean Patent Application 1020127027238, filed Apr. 14, 2011.

* cited by examiner

ADAPTIVE NOISE CANCELLATION

CROSS-REFERENCE TO RELATED APPLICATIONS

The present application is a continuation of U.S. patent application Ser. No. 12/422,917 filed Apr. 13, 2009, which is herein incorporated by reference. The present application is also related to U.S. patent application Ser. No. 12/215,980 filed Jun. 30, 2008, U.S. Pat. No. 7,076,315, U.S. Pat. No. 8,150,065, U.S. Pat. No. 8,204,253, and U.S. patent application Ser. No. 12/319,107 filed Dec. 31, 2008, all of which are herein incorporated by reference.

BACKGROUND OF THE INVENTION

Field of the Invention

The present invention relates generally to audio processing. More specifically, the present invention relates to controlling adaptivity of noise cancellation in an audio signal.

Related Art

Presently, there are many methods for reducing background noise in an adverse audio environment. Some audio devices that suppress noise utilize two or more microphones to receive an audio signal. Audio signals received by the microphones may be used in noise cancellation processing, which eliminates at least a portion of a noise component of a signal. Noise cancellation may be achieved by utilizing one or more spatial attributes derived from two or more microphone signals. In realistic scenarios, the spatial attributes of a wanted signal such as speech and an unwanted signal such as noise from the surroundings are usually different. Robustness of a noise reduction system can be adversely affected due to unanticipated variations of the spatial attributes for both wanted and unwanted signals. These unanticipated variations may result from variations in microphone sensitivity, variations in microphone positioning on audio devices, occlusion of one or more of the microphones, or movement of the device during normal usage. Accordingly, robust noise cancellation is needed that can adapt to various circumstances such as these.

SUMMARY OF THE INVENTION

Embodiments of the present technology allow control of adaptivity of noise of noise cancellation in an audio signal.

In a first claimed embodiment, a method for controlling adaptivity of noise cancellation is disclosed. The method includes receiving an audio signal at a first microphone, wherein the audio signal comprises a speech component and a noise component. A pitch salience of the audio signal may then be determined. Accordingly, a coefficient applied to the audio signal may be adapted to obtain a modified audio signal when the pitch salience satisfies a threshold. In turn, the modified audio signal is outputted via an output device.

In a second claimed embodiment, a method is set forth. The method includes receiving a primary audio signal at a first microphone and a secondary audio signal at a second microphone. The primary audio signal and the secondary audio signal both comprise a speech component. An energy estimate is determined from the primary audio signal or the secondary audio signal. A first coefficient to be applied to the primary audio signal may be adapted to generate the modified primary audio signal, wherein the application of the first coefficient may be based on the energy estimate. The modified primary audio signal is then outputted via an output device.

A third claimed embodiment discloses a method for controlling adaptivity of noise cancellation. The method includes receiving a primary audio signal at a first microphone and a secondary audio signal at a second microphone, wherein the primary audio signal and the secondary audio signal both comprise a speech component. A first coefficient to be applied to the primary audio signal is adapted to generate the modified primary audio signal. The modified primary audio signal is outputted via an output device, wherein adaptation of the first coefficient is halted based on an echo component within the primary audio signal.

In a forth claimed embodiment, a method for controlling adaptivity of noise cancellation is set forth. The method includes receiving an audio signal at a first microphone. The audio signal comprises a speech component and a noise component. A coefficient is adapted to suppress the noise component of the audio signal and form a modified audio signal. Adapting the coefficient may include reducing the value of the coefficient based on an audio noise energy estimate. The modified audio signal may then be outputted via an output device.

A fifth claimed embodiment discloses a method for controlling adaptivity of noise cancellation. The method includes receiving a primary audio signal at a first microphone and a secondary audio signal at a second microphone, wherein the primary audio signal and the secondary audio signal both comprise a speech and a noise component. A first transfer function is determined between the speech component of the primary audio signal and the speech component of the secondary signal, while a second transfer function is determined between the noise component of the primary audio signal and the noise component of the secondary audio signal. Next, a difference between the first transfer function and the second transfer function is determined. A coefficient applied to the primary audio signal is adapted to generate a modified primary signal when the difference exceeds the threshold. The modified primary audio signal may be outputted via an output device.

Embodiments of the present technology may further include systems and computer-readable storage media. Such systems can perform methods associated with controlling adaptivity of noise cancellation. The computer-readable media has programs embodied thereon. The programs may be executed by a processor to perform methods associated with controlling adaptivity of noise cancellation.

DETAILED DESCRIPTION OF EXEMPLARY EMBODIMENTS

The present technology provides methods and systems for controlling adaptivity of noise cancellation of an audio signal. More specifically, these methods and systems allow noise cancellation to adapt to changing or unpredictable conditions. These conditions include differences in hardware resulting from manufacturing tolerances. Additionally, these conditions include unpredictable environmental factors such as changing relative positions of sources of wanted and unwanted audio signals.

Controlling adaptivity of noise cancellation can be performed by controlling how a noise component is canceled in an audio signal received from one of two microphones. All or most of a speech component can be removed from an audio signal received from one of two or more microphones, resulting in a noise reference signal or a residual audio signal. The resulting residual audio signal is then processed or modified and can be then subtracted from the original primary audio signal, thereby reducing noise in the primary audio signal generating a modified audio signal. One or more coefficients can be applied to cancel or suppress the speech component in the primary signal (to generate the residual audio signal) and then to cancel or suppress at least a portion of the noise component in the primary signal (to generate the modified primary audio signal).

Figure 1:
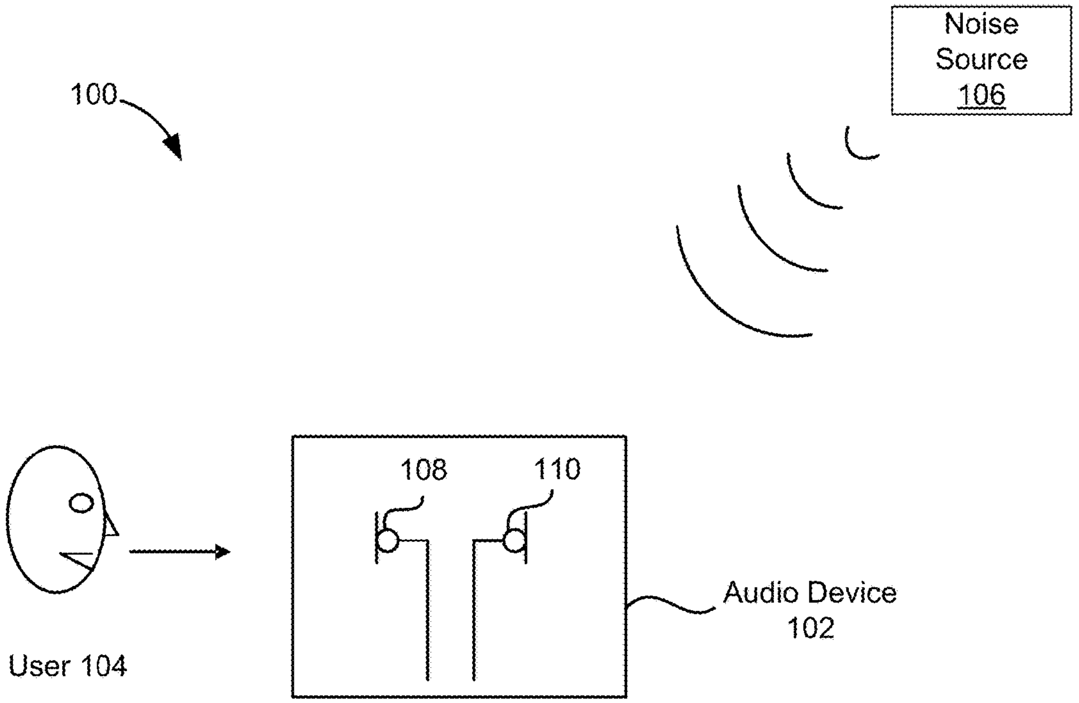
FIG. 1 is a block diagram of an exemplary environment for practicing embodiments of the present technology.

Referring now to FIG. 1, a block diagram is presented of an exemplary environment 100 for practicing embodiments of the present technology. The environment 100, as depicted, includes an audio device 102, a user 104 of the audio device 102, and a noise source 106. It is noteworthy that there may be several noise sources in the environment 100 similar to the noise source 106. Furthermore, although the noise source 106 is shown coming from a single location in FIG. 1, the noise source 106 may include any sounds from one or more locations different than the user 104, and may include reverberations and echoes. The noise source 106 may be stationary, non-stationary, or a combination of both stationary and non-stationary noise sources.

The audio device 102 may include a microphone array. In exemplary embodiments, the microphone array may comprise a primary microphone 108 relative to the user 104 and a secondary microphone 110 located a distance away from the primary microphone 108. The primary microphone 108 may be located near the mouth of the user 104 in a nominal usage position, which is described in connection with FIG. 2B. While embodiments of the present technology will be discussed with regards to the audio device 102 having two microphones (i.e., the primary microphone 108 and the secondary microphone 110), alternative embodiments may contemplate any number of microphones or acoustic sensors within the microphone array. Additionally, the primary microphone 108 and/or the secondary microphone 110 may include omni-directional microphones in accordance with some embodiments.

Figure 2A:
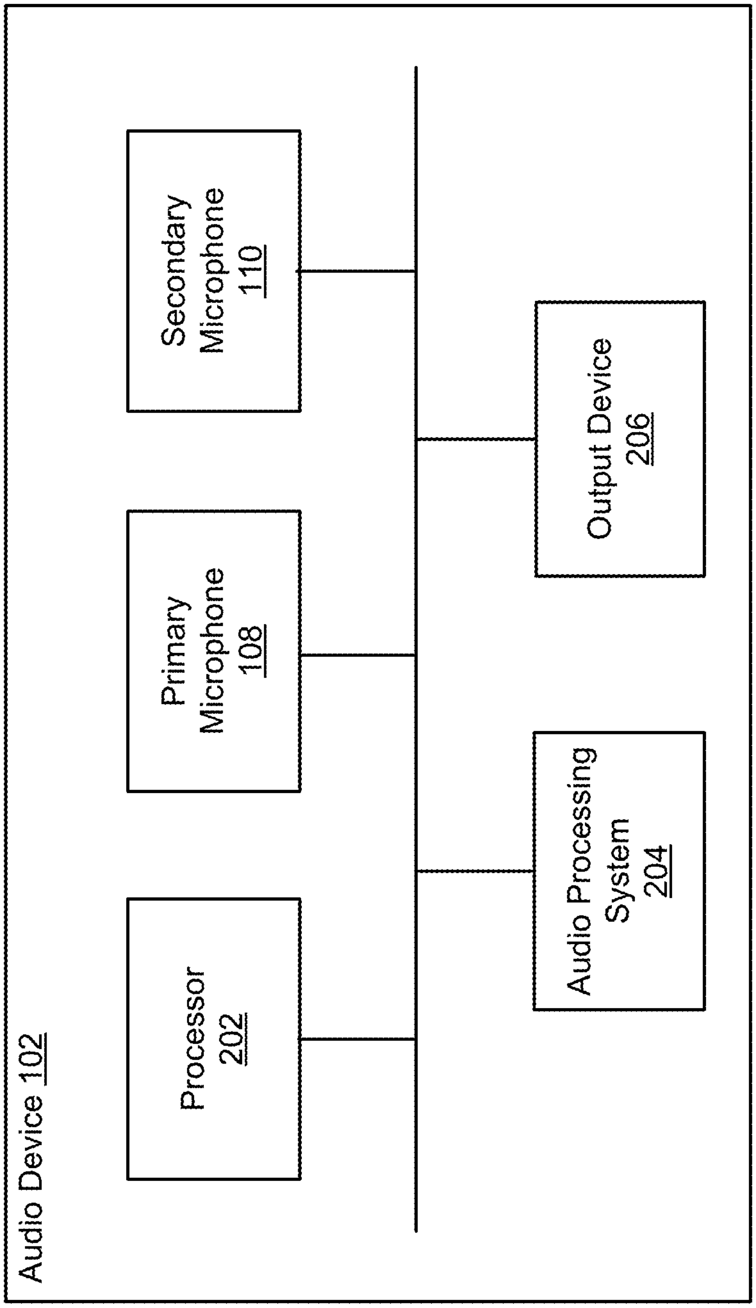
FIG. 2A is a block diagram of an exemplary audio device implementing embodiments of the present technology.

FIG. 2A is a block diagram illustrating the exemplary audio device 102 in further detail. As depicted, the audio device 102 includes a processor 202, the primary microphone 108, the secondary microphone 110, an audio processing system 204, and an output device 206. The audio device 102 may comprise further components (not shown) necessary for audio device 102 operations. For example, the audio device 102 may include memory (not shown) that comprises a computer readable storage medium. Software such as programs or other executable code may be stored on a memory within the audio device. The processor 202 may include and may execute software and/or firmware that may execute various modules described herein. The audio processing system 204 will be discussed in more detail in connection with FIG. 3.

In exemplary embodiments, the primary and secondary microphones 108 and 110 are spaced a distance apart. This spatial separation allows various differences to be determined between received acoustic signals. These differences may be used to determine relative locations of the user 104 and the noise source 106. Upon receipt by the primary and secondary microphones 108 and 110, the acoustic signals may be converted into electric signals. The electric signals may, themselves, be converted by an analog-to-digital converter (not shown) into digital signals for processing in accordance with some embodiments. In order to differentiate the acoustic signals, the acoustic signal received by the primary microphone 108 is herein referred to as the primary signal, while the acoustic signal received by the secondary microphone 110 is herein referred to as the secondary signal.

The primary microphone 108 and the secondary microphone 110 both receive a speech signal from the mouth of the user 104 and a noise signal from the noise source 106. These signals may be converted from the time-domain to the frequency-domain, and be divided into frequency subbands, as described further herein. The total signal received by the primary microphone 108 (i.e., the primary signal c) may be represented as a superposition of the speech signal s and of the noise signal n as $c=s+n$. In other words, the primary signal is a mixture of a speech component and a noise component.

Due to the spatial separation of the primary microphone 108 and the secondary microphone 110, the speech signal received by the secondary microphone 110 may have an amplitude difference and a phase difference relative to the speech signal received by the primary microphone 108. Similarly, the noise signal received by the secondary microphone 110 may have an amplitude difference and a phase difference relative to the noise signal received by the primary microphone 108. These amplitude and phase differences can be represented by complex coefficients. Therefore, the total signal received by the secondary microphone 110 (i.e., the secondary signal f) may be represented as a superposition of the speech signal s scaled by a first complex coefficient σ and of the noise signal n scaled by a second complex coefficient v as $f=\sigma s+vn$. Put differently, the secondary signal is a mixture of the speech component and noise component of the primary signal, wherein both the speech component and noise component are independently scaled in amplitude and shifted in phase relative to the primary signal. It is noteworthy that a diffuse noise component may be present in both the primary and secondary signals. In such a case, the primary signal may be represented as $c=s+n+d$, while the secondary signal may be represented as $f=\sigma s+vn+e$.

The output device 206 is any device which provides an audio output to users such as the user 104. For example, the output device 206 may comprise an earpiece of a headset or handset, or a speaker on a conferencing device. In some embodiments, the output device 206 may also be a device that outputs or transmits audio signals to other devices or users.

Figure 2B:
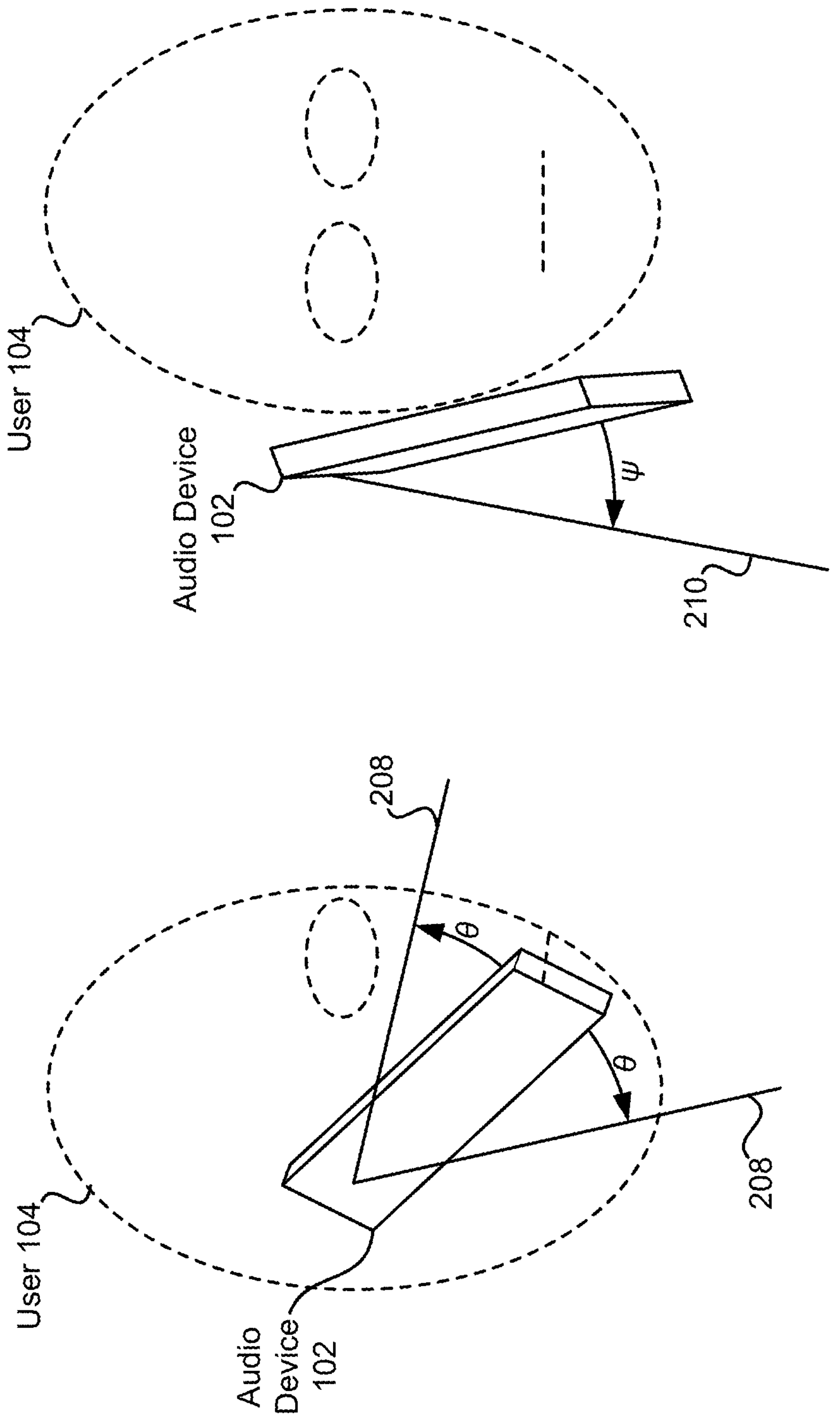
FIG. 2B illustrates a typical usage position of the audio device and variations from that position during normal usage.

FIG. 2B illustrates a typical usage position of the audio device 102 and variations from that position during normal usage. The displacement of audio device 102 from a given nominal usage position relative to the user 104 may be described using the position range 208 and the position range 210. The audio device 102 is typically positioned relative to the user 104 such that an earpiece or speaker of the audio device 102 is aligned proximal to an ear of the user 104 and the primary microphone 108 is aligned proximal to the mouth of the user 104. The position range 208 indicates that the audio device 102 can be pivoted roughly at the ear of the user 104 up or down by an angle θ. In addition, the position range 210 indicates that the audio device 102 can be pivoted roughly at the ear of the user 104 out by an angle ψ. To cover realistic usage scenarios, the angles θ and ψ can be assumed to be at least 30 degrees. However, the angles θ and ψ may vary depending on the user 104 and conditions of the environment 100.

Figure 3:
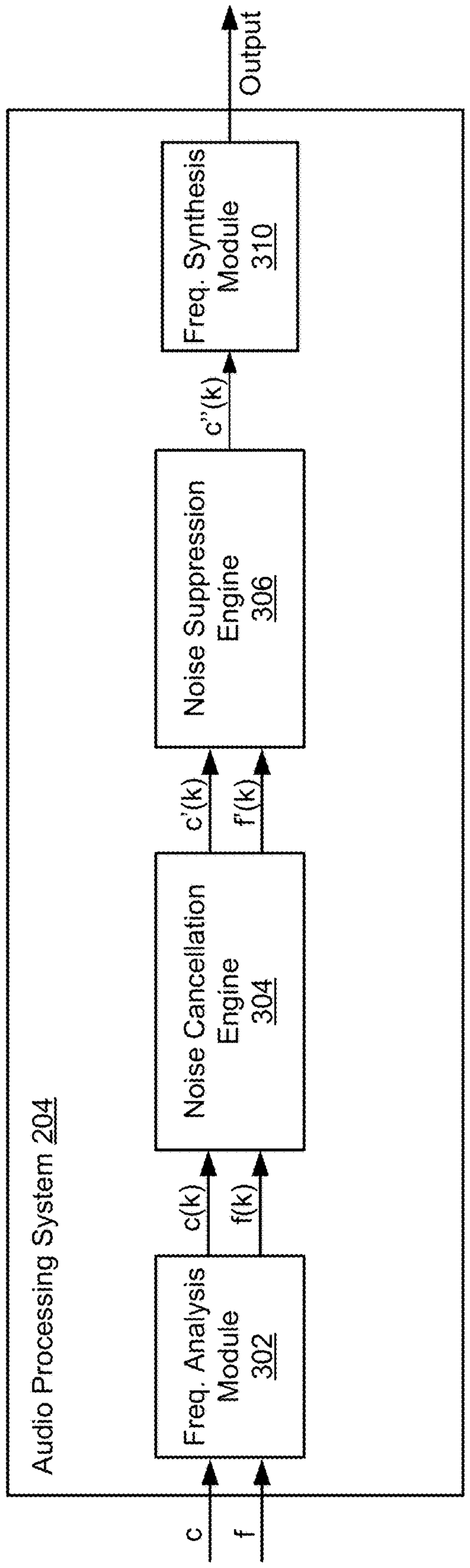
FIG. 3 is a block diagram of an exemplary audio processing system included in the audio device.

Referring now to FIG. 3, a block diagram of the exemplary audio processing system 204 included in the audio device 102 is presented. In exemplary embodiments, the audio processing system 204 is embodied within a memory (not shown) of the audio device 102. As depicted, the audio processing system 204 includes a frequency analysis module 302, a noise cancellation engine 304, a noise suppression engine (also referred to herein as noise suppression module) 306, and a frequency synthesis module 310. These modules and engines may be executed by the processor 202 of the audio device 102 to effectuate the functionality attributed thereto. The audio processing system 204 may be composed of more or less modules and engines (or combinations of the same) and still fall within the scope of the present technology. For example, the functionality of the frequency analysis module 302 and the frequency synthesis module 310 may be combined into a single module.

The primary signal c and the secondary signal f are received by the frequency analysis module 302. The frequency analysis module 302 decomposes the primary and secondary signals into frequency sub-bands. Because most sounds are complex and comprise more than one frequency, a sub-band analysis on the primary and secondary signals determines what individual frequencies are present. This analysis may be performed on a frame by frame basis. A frame is a predetermined period of time. According to one embodiment, the frame is 8 ms long. Alternative embodiments may utilize other frame lengths or no frame at all.

A sub-band results from a filtering operation on an input signal (e.g., the primary signal or the secondary signal) where the bandwidth of the filter is narrower than the bandwidth of the signal received by the frequency analysis module 302. In one embodiment, the frequency analysis module 302 utilizes a filter bank to mimic the frequency response of a human cochlea. This is described in further detail in U.S. Pat. No. 7,076,315 filed Mar. 24, 2000 and entitled "Efficient Computation of Log-Frequency-Scale Digital Filter Cascade," and U.S. patent application Ser. No. 11/441,675 filed May 25, 2006 and entitled "System and Method for Processing an Audio Signal," both of which have been incorporated herein by reference. Alternatively, other filters such as short-time Fourier transform (STFT), sub-band filter banks, modulated complex lapped transforms, cochlear models, wavelets, etc., can be used by the frequency analysis module 302. The decomposed primary signal is expressed as c(k), while the decomposed secondary signal is expressed as f(k), where k indicates the specific sub-band.

The decomposed signals c(k) and f(k) are received by the noise cancellation module 304 from the frequency analysis module 302. The noise cancellation module 304 performs noise cancellation on the decomposed signals using subtractive approaches. In exemplary embodiments, the noise subtraction engine 304 may adaptively subtract out some or the entire noise signal from the primary signal for one or more sub-bands. The results of the noise cancellation engine 304 may be outputted to the user or processed through a further noise suppression system (e.g., the noise suppression engine 306). For purposes of illustration, embodiments of the present technology will discuss the output of the noise cancellation engine 304 as being processed through a further noise suppression system. The noise cancellation module 304 is discussed in further detail in connection with FIGS. 4A, 4B and 4C.

As depicted in FIG. 3, after processing by the noise cancellation module 304, the primary and secondary signals are received by the noise suppression engine 306 as c'(k) and f'(k). The noise suppression engine 306 performs noise suppression using multiplicative approaches. According to exemplary embodiments, the noise suppression engine 306 generates gain masks to be applied to one or more of the sub-bands of the primary signal c'(k) in order to further reduce noise components that may remain after processing by the noise cancellation engine 304. This is described in further detail in U.S. patent application Ser. No. 12/286,909 filed Oct. 2, 2008 and entitled "Self Calibration of Audio Device," which has been incorporated herein by reference. The noise suppression engine 306 outputs the further processed primary signal as c"(k).

Next, the decomposed primary signal c"(k) is reconstructed by the frequency synthesis module 310. The reconstruction may include phase shifting the sub-bands of the primary signal in the frequency synthesis module 310. This is described further in U.S. patent application Ser. No. 12/319,107 filed Dec. 31, 2008 and entitled "Systems and Methods for Reconstructing Decomposed Audio Signals," which has been incorporated herein by reference. An inverse of the decomposition process of the frequency analysis module 302 may be utilized by the frequency synthesis module 310. Once reconstruction is completed, the noise suppressed primary signal may be outputted by the audio processing system 204.

Figure 4A:
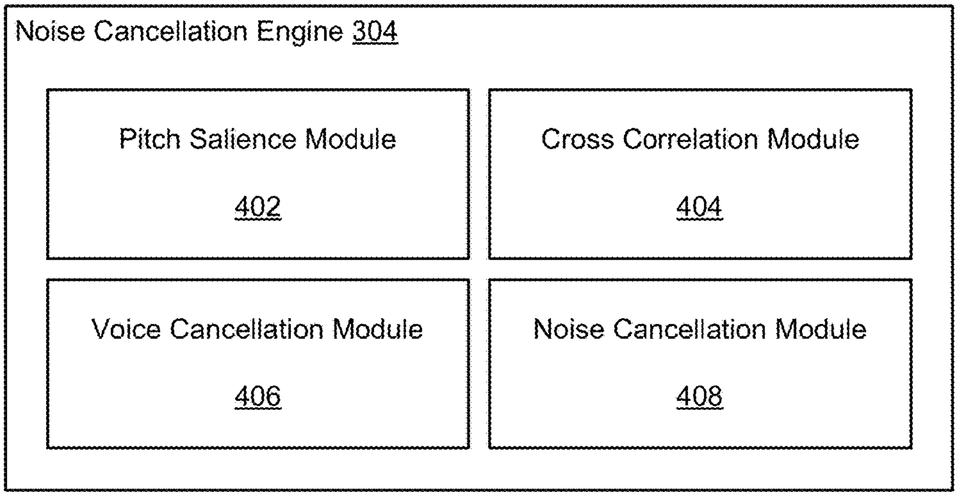
FIG. 4A is a block diagram of an exemplary noise cancellation engine included in the audio processing system.

FIG. 4A is a block diagram of the exemplary noise cancellation engine 304 included in the audio processing system 204. The noise cancellation engine 304, as depicted, includes a pitch salience module 402, a cross correlation module 404, a voice cancellation module 406, and a noise cancellation module 408. These modules may be executed by the processor 202 of the audio device 102 to effectuate the functionality attributed thereto. The noise cancellation engine 304 may be composed of more or less modules (or combinations of the same) and still fall within the scope of the present technology.

The pitch salience module 402 is executable by the processor 202 to determine the pitch salience of the primary signal. In exemplary embodiments, pitch salience may be determined from the primary signal in the time-domain. In other exemplary embodiments, determining pitch salience includes converting the primary signal from the time-domain to the frequency-domain. Pitch salience can be viewed as an estimate of how periodic the primary signal is and, by extension, how predictable the primary signal is. To illustrate, pitch salience of a perfect sine wave is contrasted with pitch salience of white noise. Since a perfect sine wave is purely periodic and has no noise component, the pitch salience of the sine wave has a large value. White noise, on the other hand, has no periodicity by definition, so the pitch salience of white noise has a small value. Voiced components of speech typically have a high pitch salience, and can thus be distinguished from many types of noise, which have a low pitch salience. It is noted that the pitch salience module 402 may also determine the pitch salience of the secondary signal.

The cross correlation module 404 is executable by the processor 202 to determine transfer functions between the primary signal and the secondary signal. The transfer functions include complex values or coefficients for each sub-band. One of these complex values denoted by $\hat{\sigma}$ is associated with the speech signal from the user 104, while another complex value denoted by $\hat{v}$ is associated with the noise signal from the noise source 106. More specifically, the first complex value $\hat{\sigma}$ for each sub-band represents the difference in amplitude and phase between the speech signal in the primary signal and the speech signal in the secondary signal for the respective sub-band. In contrast, the second complex value $\hat{v}$ for each sub-band represents the difference in amplitude and phase between the noise signal in the primary signal and the noise signal in the secondary signal for the respective sub-band. In exemplary embodiments, the transfer function may be obtained by performing a cross-correlation between the primary signal and the secondary signal.

The first complex value $\hat{\sigma}$ of the transfer function may have a default value or reference value $\sigma_{ref}$ that is determined empirically through calibration. A head and torso simulator (HATS) may be used for such calibration. A HATS system generally includes a mannequin with built-in ear and mouth simulators that provides a realistic reproduction of acoustic properties of an average adult human head and torso. HATS systems are commonly used for in situ performance tests on telephone handsets. An exemplary HATS system is available from Brüel & Kjær Sound & Vibration Measurement A/S of Nærum, Denmark. The audio device 102 can be mounted to a mannequin of a HATS system. Sounds produced by the mannequin and received by the primary and secondary microphones 108 and 110 can then be measured to obtain the reference value $\sigma_{ref}$ of the transfer function. Obtaining the phase difference between the primary signal and the secondary signal can be illustrated by assuming that the primary microphone 108 is separated from the secondary microphone 110 by a distance d. The phase difference of a sound wave (of a single frequency) incident on the two microphones is proportional to the frequency $f_{sw}$ of the sound wave and the distance d. This phase difference can be approximated analytically as $\phi \approx 2\pi f_{sw} d \cos(\beta)/c$, where c is the speed of sound and β is the angle of incidence of the sound wave upon the microphone array.

The voice cancellation module 406 is executable by the processor 202 to cancel out or suppress the speech component of the primary signal. According to exemplary embodiments, the voice cancellation module 406 achieves this by utilizing the first complex value $\hat{\sigma}$ of the transfer function determined by the cross-correlation module 404. A signal entirely or mostly devoid of speech may be obtained by subtracting the product of the primary signal c(k) and $\hat{\sigma}$ from the secondary signal on a sub-band by sub-band basis. This can be expressed as $$f(k)-\hat{\sigma}\cdot c(k)\approx f(k)-\sigma\cdot c(k)=(v-\sigma)n(k)$$

when $\hat{\sigma}$ is approximately equal to σ. The signal expressed by (v−σ)n(k) is a noise reference signal or a residual audio signal, and may be referred to as a speech-devoid signal.

Figure 4B:
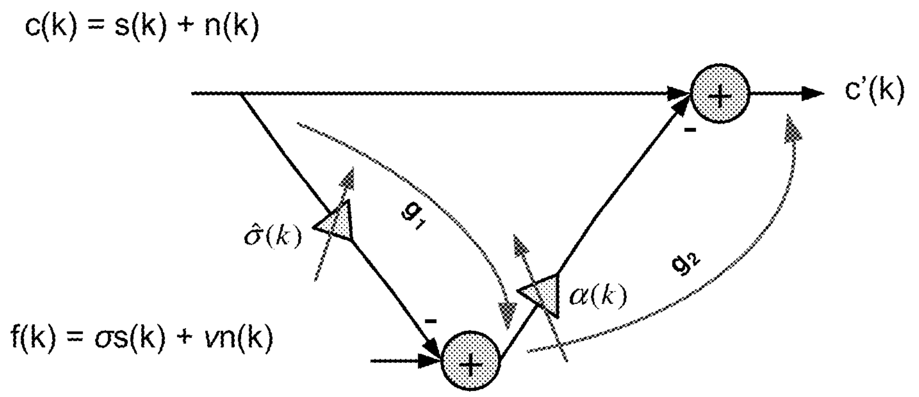
FIG. 4B is a schematic illustration of operations of the noise cancellation engine in a particular frequency sub-band.

FIG. 4B is a schematic illustration of operations of the noise cancellation engine 304 in a particular frequency sub-band. The primary signal c(k) and the secondary signal f(k) are inputted at the left. The schematic of FIG. 4B shows two branches. In the first branch, the primary signal c(k) is multiplied by the first complex value $\hat{\sigma}$. That product is then subtracted from the secondary signal f(k), as described above, to obtain the speech-devoid signal (v−σ)n(k). These operations are performed by the voice cancellation module 406. The gain parameter $g_1$ represents the ratio between primary signal and the speech-devoid signal. FIG. 4B is revisited below with respect to the second branch.

Under certain conditions, the value of $\hat{\sigma}$ may be adapted to a value that is more effective in canceling the speech component of the primary signal. This adaptation may be subject to one or more constraints. Generally speaking, adaptation may be desirable to adjust for unpredicted occurrences. For example, since the audio device 102 can be moved around as illustrated in FIG. 2B, the actual transfer function for the noise source 106 between the primary signal and the secondary signal may change. Additionally, differences in predicted position and sensitivity of the primary and secondary microphones 108 and 110 may cause the actual transfer function between the primary signal and the secondary signal to deviate from the value determined by calibration. Furthermore, in some embodiments, the secondary microphone 110 is placed on the back of the audio device 102. As such, a hand of the user 104 can create an occlusion or an enclosure over the secondary microphone 110 that may distort the transfer function for the noise source 106 between the primary signal and the secondary signal.

The constraints for adaptation of $\hat{\sigma}$ by the voice cancellation module 406 may be divided into sub-band constraints and global constraints. Sub-band constraints are considered individually per sub-band, while global constraints are considered over multiple sub-bands. Sub-band constraints may also be divided into level and spatial constraints. All constraints are considered on a frame by frame basis in exemplary embodiments. If a constraint is not met, adaptation of $\hat{\sigma}$ may not be performed. Furthermore, in general, $\hat{\sigma}$ is adapted within frames and sub-bands that are dominated by speech.

One sub-band level constraint is that the energy of the primary signal is some distance away from the stationary noise estimate. This may help prevent maladaptation with quasi-stationary noise. Another sub-band level constraint is that the primary signal energy is at least as large as the minimum expected speech level for a given frame and sub-band. This may help prevent maladaptation with noise that is low level. Yet another sub-band level constraint is that $\hat{\sigma}$ should not be adapted when a transfer function or energy difference between the primary and secondary microphones indicates that echoes are dominating a particular sub-band or frame. In one exemplary embodiment, for microphone configurations where the secondary microphone is closer to a loudspeaker or earpiece than the primary microphone, $\hat{\sigma}$ should not be adapted when the secondary signal has a greater magnitude than the primary signal. This may help prevent adaptation to echoes.

Figure 4C:
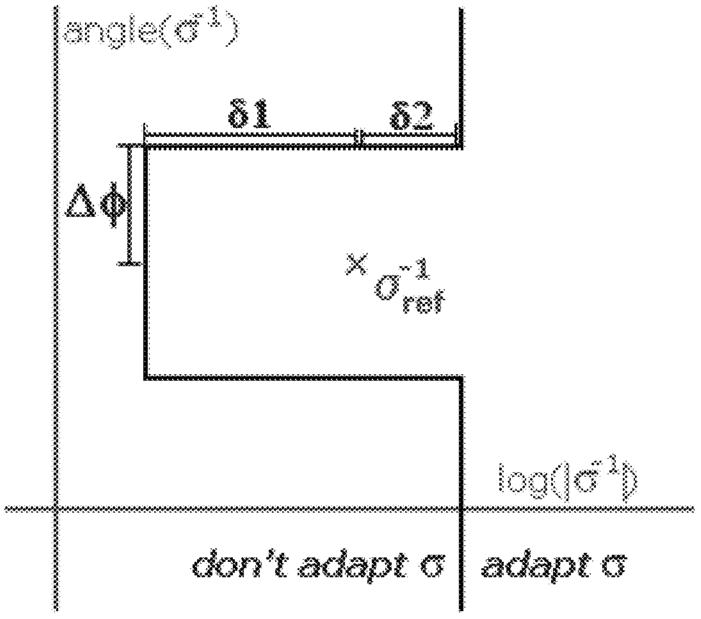
FIG. 4C illustrates a spatial constraint associated with adaptation by modules of the noise cancellation engine.

A sub-band spatial constraint for adaptation of $\hat{\sigma}$ by the voice cancellation module 406 may be applied for various frequency ranges. FIG. 4C illustrates one spatial constraint for a single sub-band. In exemplary embodiments, this spatial constraint may be invoked for sub-bands below approximately 0.5-1 kHz. The x-axis in FIG. 4C generally corresponds to the inter-microphone level difference (ILD) expressed as log $(|\sigma^{-1}|)$ between the primary signal and the secondary signal, where high ILD is to the right and low ILD is to the left. Conventionally, the ILD is positive for speech since the primary microphone is generally closer to the mouth than the secondary microphone. The y-axis marks the angle of the complex coefficient σ that denotes the phase difference between the primary and secondary signal. The 'x' marks the location of the reference value $\sigma_{ref}^{-1}$ determined through calibration. The parameters $\Delta\phi$, $\delta 1$, and $\delta 2$ define a region in which $\hat{\sigma}$ may be adapted by the voice cancellation module 406. The parameter $\Delta\phi$ may be proportional to the center frequency of the sub-band and the distance between the primary microphone 108 and the secondary microphone 110. Additionally, in some embodiments, a leaky integrator may be used to smooth the value of $\hat{\sigma}$ over time.

Another sub-band spatial constraint is that the magnitude of $\sigma^{-1}$ for the speech signal $|\sigma^{-1}|$ should be greater than the magnitude of $v^{-1}$ for the noise signal $|v^{-1}|$ in a given frame and sub-band. Furthermore, v may be adapted when speech is not active based on any or all of the individual sub-band and global constraints controlling adaptation of $\hat{\sigma}$ and other constraints not embodied in adaptation of $\hat{\sigma}$. This constraint may help prevent maladaptation within noise that may arrive from a spatial location that is within the permitted $\sigma$ adaptation region defined by the first sub-band spatial constraint.

As mentioned, global constraints are considered over multiple sub-bands. One global constraint for adaptation of $\hat{\sigma}$ by the voice cancellation module 406 is that the pitch salience of the primary signal determined by the pitch salience module 402 exceeds a threshold. In exemplary embodiments, this threshold is 0.7, where a value of 1 indicates perfect periodicity, and a value of zero indicates no periodicity. A pitch salience threshold may also be applied to individual sub-bands and, therefore, be used as a sub-band constraint rather than a global restraint. Another global constraint for adaptation of $\hat{\sigma}$ may be that a minimum number of low frequency sub-bands (e.g., sub-bands below approximately 0.5-1 kHz) must satisfy the sub-band level constraints described herein. In one embodiment, this minimum number equals half of the sub-bands. Yet another global constraint is that a minimum number of low frequency sub-bands that satisfy the sub-band level constraints should also satisfy the sub-band spatial constraint described in connection with FIG. 4C.

Referring again to FIG. 4A, the noise cancellation module 408 is executable by the processor 202 to cancel out or suppress the noise component of the primary signal. The noise cancellation module 408 subtracts a noise signal from the primary signal to obtain a signal dominated by the speech component. In exemplary embodiments, the noise signal is derived from the speech-devoid signal (i.e., $(v-\sigma)n(k)$) of the voice cancellation module 406 by multiplying that signal by a coefficient $\alpha(k)$ on a sub-band by sub-band basis. Accordingly, the coefficient $\alpha$ has a default value equal to $(v-\sigma)^{-1}$. However, the coefficient $\alpha(k)$ may also be adapted under certain conditions and be subject to one or more constraints.

Returning to FIG. 4B, the coefficient $\alpha(k)$ is depicted in the second branch. The speech-devoid signal (i.e., $(v-\sigma)n(k)$) is multiplied by $\alpha(k)$, and then that product is subtracted from the primary signal c(k) to obtain a modified primary signal c'(k). These operations are performed by the noise cancellation module 408. The gain parameter $g_2$ represents the ratio between the speech-devoid signal and c'(k). In exemplary embodiments, the signal c'(k) will be dominated by the speech signal received by the primary microphone 108 with minimal contribution from the noise signal.

The coefficient $\alpha$ can be adapted for changes in noise conditions in the environment 100 such as a moving noise source 106, multiple noise sources or multiple reflections of a single noise source. One constraint is that the noise cancellation module 408 only adapts $\alpha$ when there is no speech activity. Thus, $\alpha$ is only adapted when $\hat{\sigma}$ is not being adapted by the voice cancellation module 406. Another constraint is that a should adapt towards zero (i.e., no noise cancellation) if the primary signal, secondary signal, or speech-devoid signal (i.e., $(v-\sigma)n(k)$) of the voice cancellation module 406 is below some minimum energy threshold. In exemplary embodiments, the minimum energy threshold may be based upon an energy estimate of the primary or secondary microphone self-noise.

Yet another constraint for adapting $\alpha$ is that the following equation is satisfied:

$$g_2 \cdot \gamma > \frac{g_1}{\gamma},$$

where $\gamma=\sqrt{2}/|\hat{v}-\hat{\sigma}|^2$ and $\hat{v}$ is a complex value which estimates the transfer function between the primary and secondary microphone signals for the noise source. The value of $\hat{v}$ may be adapted based upon a noise activity detector, or any or all of the constraints that are applied to adaptation of the voice cancellation module 406. This condition implies that more noise is being canceled relative to speech. Conceptually, this may be viewed as noise activity detection. The left side of the above equation $(g_2 \cdot \gamma)$ is related to the signal to noise ratio (SNR) of the output of the noise cancellation engine 304, while the right side of the equation $(g_1/\gamma)$ is related to the SNR of the input of the noise cancellation engine 304. It is noteworthy that $\gamma$ is not a fixed value in exemplary embodiments since actual values of $\hat{v}$ and $\hat{\sigma}$ can be estimated using the cross correlation module 404 and voice cancellation module 406. As such, the difference between $\hat{v}$ and $\hat{\sigma}$ must be less than a threshold to satisfy this condition.

Figure 5:
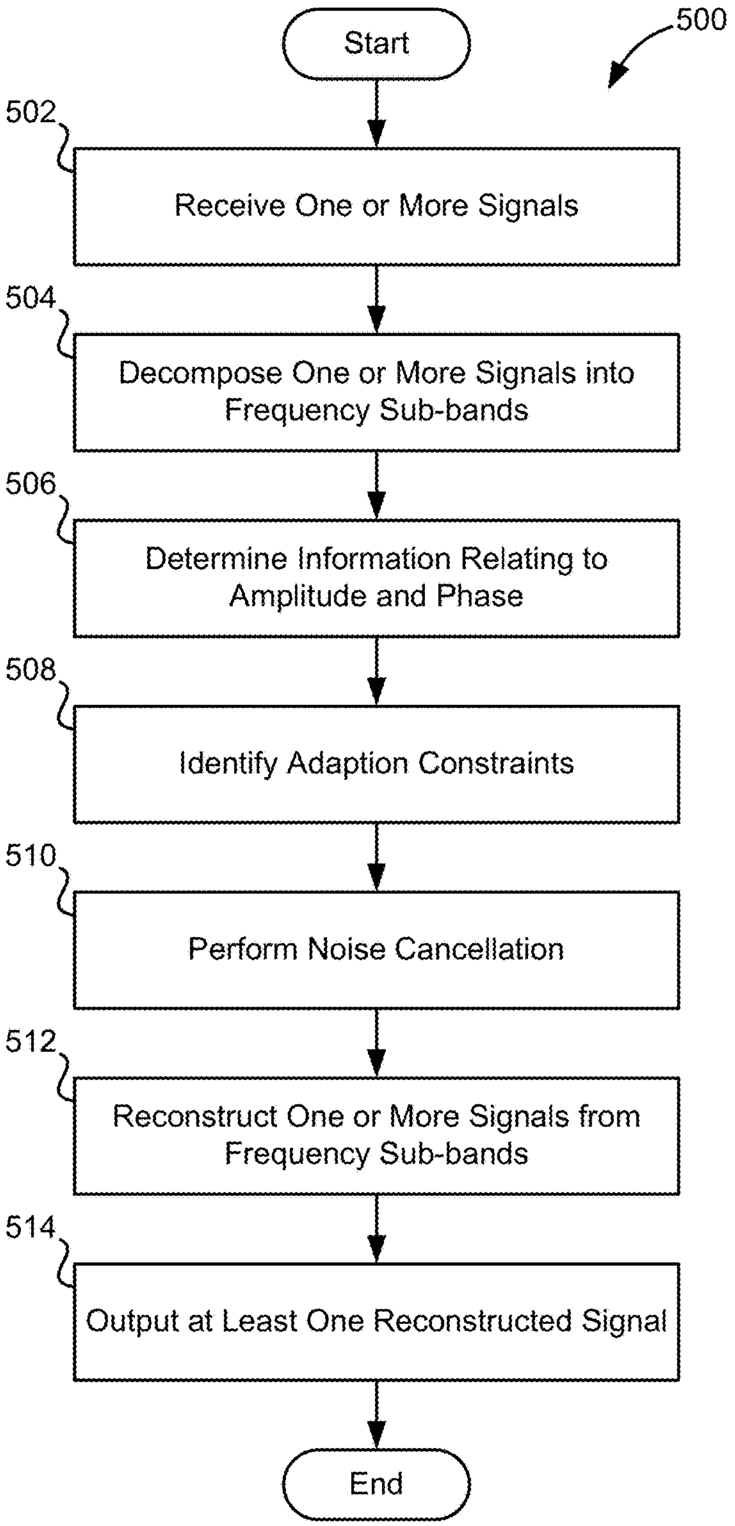
FIG. 5 is a flowchart of an exemplary method for controlling adaptivity of noise cancellation.

FIG. 5 is a flowchart of an exemplary method 500 for controlling adaptivity of noise cancellation. The method 500 may be performed by the audio device 102 through execution of various engines and modules described herein. The steps of the method 500 may be performed in varying orders. Additionally, steps may be added or subtracted from the method 500 and still fall within the scope of the present technology.

In step 502, one or more signals are received. In exemplary embodiments, these signals comprise the primary signal received by the primary microphone 108 and the secondary signal received by the secondary microphone 110. These signals may originate at a user 104 and/or a noise source 106. Furthermore, the received one or more signals may each include a noise component and a speech component.

In step 504, the received one or more signals are decomposed into frequency sub-bands. In exemplary embodiments, step 504 is performed by execution of the frequency analysis module 302 by the processor 202.

In step 506, information related to amplitude and phase is determined for the received one or more signals. This information may be expressed by complex values. Moreover, this information may include transfer functions that indicate amplitude and phase differences between two signals or corresponding frequency sub-bands of two signals. Step 506 may be performed by the cross correlation module 404.

In step 508, adaptation constraints are identified. The adaptation constraints may control adaptation of one or more coefficients applied to the one or more received signals. The one or more coefficients (e.g., $\hat{\sigma}$ or $\alpha$) may be applied to suppress a noise component or a speech component.

One adaptation constraint may be that a determined pitch salience of the one or more received signals should exceed a threshold in order to adapt a coefficient (e.g., $\hat{\sigma}$).

Another adaptation constraint may be that a coefficient (e.g., $\hat{\sigma}$) should be adapted when an amplitude difference between two received signals is within a first predetermined range and a phase difference between the two received signals is within a second predetermined range.

Yet another adaptation constraint may be that adaptation of a coefficient (e.g., $\hat{\sigma}$) should be halted when echo is determined to be in either microphone, for example, based upon a comparison between the amplitude of a primary signal and an amplitude of a secondary signal.

Still another adaptation constraint is that a coefficient (e.g., $\alpha$) should be adjusted to zero when an amplitude of a noise component is less than a threshold. The adjustment of the coefficient to zero may be gradual so as to fade the value of the coefficient to zero over time. Alternatively, the adjustment of the coefficient to zero may be abrupt or instantaneous.

One other adaptation constraint is that a coefficient (e.g., $\alpha$) should be adapted when a difference between two transfer functions exceeds or is less than a threshold, one of the transfer functions being an estimate of the transfer function between a speech component of a primary signal and a speech component of a secondary signal, and the other transfer function being an estimate of the transfer function between a noise component of the primary signal and a noise component of the secondary signal.

In step 510, noise cancellation consistent with the identified adaptation constraints is performed on the one or more received signals. In exemplary embodiments, the noise cancellation engine 304 performs step 510.

In step 512, the one or more received signals are reconstructed from the frequency sub-bands. The frequency synthesis module 310 performs step 512 in accordance with exemplary embodiments.

In step 514, at least one reconstructed signal is outputted. In exemplary embodiments, the reconstructed signal is outputted via the output device 206.

It is noteworthy that any hardware platform suitable for performing the processing described herein is suitable for use with the technology. Computer-readable storage media refer to any medium or media that participate in providing instructions to a central processing unit (CPU) such as the processor 202 for execution. Such media can take forms, including, but not limited to, non-volatile and volatile media such as optical or magnetic disks and dynamic memory, respectively. Common forms of computer-readable storage media include a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for controlling adaptivity of noise cancellation, the method comprising:

receiving an audio signal from a first microphone and another audio signal from a second microphone:

determining a pitch salience of the audio signal, the audio signal and the another audio signal both comprising a speech component and a noise component; and determining a coefficient that represents a cross-correlation between the audio signal and the another audio signal of one of the speech component and the noise component that exists in both the audio signal and the another audio signal;

generating a modified audio signal for the audio signal based on the another audio signal and the coefficient; and adapting the coefficient when the pitch salience satisfies a threshold.

2. The method of claim 1, further comprising adapting the coefficient for each frequency sub-band of the audio signal.

3. The method of claim 1, wherein adapting the coefficient includes:

determining a pitch salience of the audio signal or the another audio signal, wherein the audio signal is received from a first microphone and the another audio signal is received from a second microphone; and adapting the coefficient based on the pitch salience.

4. The method of claim 1, further comprising converting the audio signal from the time-domain to the frequency-domain.

5. The method of claim 1, further comprising:

adapting the coefficient to suppress the speech component of the audio signal to form a residual audio signal; and suppressing the noise component of the audio signal based on the residual audio signal to generate a modified primary audio signal.

6. The method of claim 1, wherein determining the coefficient includes determining a reference value of the coefficient by a calibration procedure using the first and second microphones.

7. The method of claim 1, wherein the coefficient is used to substantially remove the speech component from the audio signal to obtain the modified audio signal, the modified audio signal being further combined with the another audio signal to obtain a modified another audio signal, the modified another audio signal being used to remove the noise component from the audio signal.

8. A method for controlling adaptivity of noise cancellation, the method comprising:

receiving a primary audio signal at a first microphone and a secondary audio signal at a second microphone, the primary audio signal and the secondary audio signal both comprising a speech component;

determining an energy estimate from the primary audio signal or the secondary audio signal, the primary audio signal and the secondary audio signal both comprising a speech component, the primary audio signal and the secondary audio signal each representing at least one respective captured sound; and determining a coefficient that represents a cross-correlation between the primary audio signal and the secondary audio signal of the speech component that exists in both the primary audio signal and the secondary audio signal generating a modified primary audio signal for the primary audio signal based on the secondary audio signal and the coefficient; and adapting the coefficient based on the energy estimate.

9. The method of claim 8, wherein adapting the coefficient is determined by an energy threshold applied to the primary or secondary energy estimate, the method further comprising:

adapting the coefficient to suppress the speech component of the primary audio signal to form a residual audio signal, the coefficient being adapted based on the primary energy estimate or the secondary energy estimate; and suppressing the noise component of the primary audio signal based on the residual audio signal to generate the modified primary audio signal.

10. The method of claim 9, wherein the energy threshold is determined by a training or calibration procedure.

11. The method of claim 9, wherein the energy threshold is determined by a stationary noise energy estimate of the primary or secondary audio signals.

12. The method of claim 8, wherein adapting the coefficient comprises determining an amplitude difference and a phase difference between the primary audio signal and the secondary audio signal.

13. The method of claim 12, wherein the coefficient is adapted when the amplitude difference is within a first predefined range and the phase difference is within a second predefined range.

14. The method of claim 12, wherein determining the amplitude difference and the phase difference is performed on individual frequency sub-bands of the audio signal.

15. The method of claim 8, wherein determining the coefficient includes determining a reference value of the coefficient by a calibration procedure using the first and second microphones.

16. A non-transitory computer-readable storage medium having a program embodied thereon, the program executable by a processor to perform a method for controlling adaptivity of noise cancellation, the method comprising:

receiving a primary audio signal from a first microphone and a secondary audio signal from a second microphone, the primary audio signal and the secondary audio signal both comprising a speech component;

determining a coefficient that represents a cross-correlation between the primary audio signal and the secondary audio signal of the speech component that exists in both the primary audio signal and the secondary audio signal generating a modified primary audio signal for the primary audio signal based on the secondary audio signal and the coefficient; and halting wherein adaptation of the coefficient is halted based on an echo component within the primary audio signal, wherein the coefficient is faded to zero when a noise energy estimate is less than a threshold, and wherein the threshold is determined by an estimate of microphone self-noise in the primary or secondary audio signal.

17. The non-transitory computer-readable storage medium of claim 16, wherein the echo component is determined based on an estimate of far-end activity in the primary audio signal.

18. The non-transitory computer-readable storage medium of claim 16, wherein adaptation of the coefficient is halted when the estimate of far-end activity exceeds a threshold.

19. The non-transitory computer-readable storage medium of claim 16, wherein the echo component is determined based on a comparison of an amplitude of the speech component of the primary audio signal and an amplitude of the speech component of the secondary audio signal.

20. The non-transitory computer-readable storage medium of claim 16, further comprising:

adapting the coefficient based on the echo component within the primary audio signal to suppress the speech component of the primary audio signal to form a residual audio signal;

suppressing the noise component of the primary audio signal based on the residual audio signal to generate a modified primary audio signal; and halting adaptation of the coefficient applied to the primary audio signal when the amplitude of the primary audio signal speech component is less than the amplitude of the secondary audio signal speech component.

* * * * *